(12) United States Patent
Pasma et al.

(10) Patent No.: US 11,431,047 B2
(45) Date of Patent: Aug. 30, 2022

(54) FEEDTHROUGH WITH INTEGRATED INSULATOR

(71) Applicant: Apple Inc., Cupertino, CA (US)

(72) Inventors: Christopher R. Pasma, Redwood City, CA (US); Brian K. Shiu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 16/040,719

(22) Filed: Jul. 20, 2018

(65) Prior Publication Data
US 2019/0341587 A1    Nov. 7, 2019

Related U.S. Application Data

(60) Provisional application No. 62/667,713, filed on May 7, 2018.

(51) Int. Cl.
| | |
|---|---|
| *H01M 50/119* | (2021.01) |
| *H01M 50/145* | (2021.01) |
| *H01M 50/191* | (2021.01) |
| *H01M 10/0585* | (2010.01) |
| *H01M 50/172* | (2021.01) |
| *H01M 50/116* | (2021.01) |
| *H01M 50/543* | (2021.01) |

(52) U.S. Cl.
CPC ....... *H01M 50/172* (2021.01); *H01M 50/116* (2021.01); *H01M 50/543* (2021.01)

(58) Field of Classification Search
CPC ........ H01M 2/06; H01M 2/0277; H01M 2/30; H01M 2/027; H01M 2/0217; H01M 10/0585; H01M 2/08; H01M 2/22; H01M 2/34; H01M 10/058

USPC ......................................................... 429/179
See application file for complete search history.

(56) References Cited

U.S. PATENT DOCUMENTS

| | | | |
|---|---|---|---|
| 4,350,747 | A | 9/1982 | Alberto |
| 4,358,514 | A | 11/1982 | Garoutte et al. |
| 4,559,283 | A | 12/1985 | Kruger et al. |
| 4,572,877 | A | 2/1986 | Botos |

(Continued)

FOREIGN PATENT DOCUMENTS

| | | |
|---|---|---|
| CA | 2755597 C | 1/2015 |
| CN | 101533899 | 9/2009 |

(Continued)

*Primary Examiner* — Christian Roldan
(74) *Attorney, Agent, or Firm* — BakerHostetler

(57) ABSTRACT

The disclosed technology relates to an electrical feedthrough for a battery cell. The electrical feedthrough may include a rivet, an outer gasket, an inner gasket, a terminal and an insulator. The rivet compresses the outer gasket, inner gasket, and terminal to create a hermetic seal at an opening through an enclosure of the battery cell. The inner gasket includes a recessed portion for seating of the terminal to prevent rotation of the terminal with respect to the inner gasket, a protrusion for engaging a corresponding notch on the terminal to further prevent rotation of the terminal with respect to the inner gasket, and a mating surface for attaching to the insulator to align and position the insulator within the enclosure. The insulator is positioned between the battery cell and the inner gasket to prevent physical and electrical contact between the set of layers and the feedthrough.

15 Claims, 9 Drawing Sheets

(56) References Cited

U.S. PATENT DOCUMENTS

| | | | |
|---|---|---|---|
| 5,004,656 A | 4/1991 | Sato et al. | |
| 6,426,163 B1 | 7/2002 | Pasquier et al. | |
| 8,043,738 B2 | 10/2011 | Suzuki et al. | |
| 9,118,087 B2 | 8/2015 | Abe et al. | |
| 9,616,518 B2 | 4/2017 | Kroll et al. | |
| 2003/0017390 A1 | 1/2003 | Probst et al. | |
| 2003/0096162 A1 | 5/2003 | Lasater et al. | |
| 2003/0124420 A1 | 7/2003 | Fong et al. | |
| 2004/0191621 A1 | 9/2004 | Heller | |
| 2007/0090788 A1* | 4/2007 | Hansford | H02J 7/00047 320/107 |
| 2007/0122697 A1 | 5/2007 | Wutz et al. | |
| 2011/0189535 A1 | 8/2011 | Kim et al. | |
| 2012/0160558 A1* | 6/2012 | Okamoto | H01M 2/30 174/551 |
| 2012/0202107 A1* | 8/2012 | Ito | H01M 50/15 429/163 |
| 2012/0237817 A1 | 9/2012 | Kim et al. | |
| 2015/0140417 A1 | 5/2015 | Matumoto et al. | |
| 2016/0268582 A1 | 9/2016 | Lee et al. | |
| 2016/0315306 A1* | 10/2016 | Jang | H01M 2/06 |
| 2017/0092907 A1 | 3/2017 | Hyung et al. | |
| 2017/0162838 A1 | 6/2017 | Revirand et al. | |
| 2018/0026256 A1* | 1/2018 | Inoue | H01M 50/578 429/61 |
| 2018/0083312 A1 | 3/2018 | Shiu et al. | |
| 2020/0083498 A1 | 3/2020 | Shiu et al. | |
| 2020/0373548 A1* | 11/2020 | Kozuki | H01M 50/543 |

FOREIGN PATENT DOCUMENTS

| | | |
|---|---|---|
| CN | 102197515 | 9/2011 |
| CN | 102629672 | 8/2012 |
| CN | 104781946 | 7/2015 |
| CN | 105118954 | 12/2015 |
| CN | 106413972 A | 2/2017 |
| EP | 1620907 B1 | 8/2007 |
| JP | S61-224263 A | 10/1986 |
| JP | 2008-192552 | 8/2008 |
| WO | WO 2004/086538 A2 | 10/2004 |

\* cited by examiner

FEEDTHROUGH WITH INTEGRATED INSULATOR

PRIORITY

This application claims the benefit under 35 U.S.C. § 119(e) of U.S. Provisional Patent Application Ser. No. 62/667,713, entitled "FEEDTHROUGH WITH INTEGRATED INSULATOR," filed on May 7, 2018, which is incorporated herein by reference in its entirety.

TECHNICAL FIELD

The present disclosure relates generally to battery cell feedthroughs, and more particularly, to a battery cell feedthrough with an integrated insulator.

BACKGROUND

Battery cells are used to provide power to a wide variety of portable electronic devices, including laptop computers, tablet computers, mobile phones, personal digital assistants (PDAs), digital music players, watches, and wearable devices. A commonly used type of battery is a lithium battery, which can include a lithium-ion or a lithium-polymer battery.

Lithium batteries often include cells that are made of alternating layers of anode and cathode electrodes, with a separator disposed there-between. The layers may be packaged in an enclosure. Anode electrodes of the cell may be electrically coupled to a wall of the enclosure where the enclosure is itself, made of a conductive material. The cathode electrodes, however, may require an electrical feedthrough to enable an electrical connection, through the enclosure, to the cathode electrodes. In addition, electrical feedthroughs must insulate the electrical connection to the cathode from the enclosure to prevent shorting of the battery cells. Conventional insulator materials include glass, and ceramics that inhibit conduction of electrical energy. Further, the enclosure enclosing the electrodes may be filled with electrolyte thereby requiring the electrical feedthrough to provide a hermetically seal to prevent unwanted leakage or failure.

In some variations, a welding process may be used to physically couple the electrical feedthrough to a wall of the enclosure. Welding may complicate assembly of the battery cell and may further require additional space on the enclosure to accommodate a proper weld, thereby reducing packaging efficiency. In addition, welding may cause heat-induced stresses in a feedthrough that may compromise the sealing integrity of the feedthrough.

SUMMARY

The disclosed embodiments provide for a battery cell enclosed within an enclosure that utilizes a riveted feedthrough. The feedthrough includes a rivet, an outer gasket, an inner gasket, a terminal and an insulator. The rivet compresses the outer gasket, inner gasket, and terminal to create a seal at an opening in the enclosure. The inner gasket includes a recessed portion for seating of the terminal, a mating surface for attaching to the insulator, and a protrusion for engaging a corresponding notch on the terminal to prevent rotation of the terminal with respect to the inner gasket. The insulator prevents physical contact between electrodes within the enclosure and the feedthrough.

In some embodiments, a battery feedthrough includes a rivet comprising a planar head at an end, a shank extending therefrom, and a deformable tail at an opposite end. The feedthrough also includes an outer gasket disposed adjacent to the planar head of the rivet. The outer gasket includes an opening for receiving the shank of the rivet, and a collar. The feedthrough also includes an inner gasket disposed on the collar of the outer gasket. The inner gasket includes an opening for receiving the collar of the outer gasket, a recessed area, an insulator mating surface, and an anti-rotation protrusion. The feedthrough also includes a terminal disposed within the recessed area of the inner gasket. The terminal includes an opening for receiving the shank of the rivet and a notch for engaging the anti-rotation protrusion of the inner gasket. The feedthrough also includes an insulator supported by the insulator mating surface of the inner gasket.

In some embodiments, a method for manufacturing a battery cell is disclosed. The method includes sliding a rivet within an opening of an outer gasket, sliding the outer gasket within an opening disposed on a wall of an enclosure. The enclosure protects a set of layers that includes a cathode layer, an anode layer, and a separator layer disposed between the cathode layer and the anode layer. The method also includes inserting an inner gasket over a collar of the outer gasket and against an inside surface of the enclosure. The inner gasket includes a recessed portion, a mating surface, and an anti-rotation protrusion. The method further includes seating a terminal within the recessed portion of the inner gasket and onto the rivet. The terminal includes a notch for engaging the anti-rotation protrusion of the inner gasket to prevent rotation of the terminal with respect to the inner gasket. The method also includes deforming an end of the rivet to create a hermetic seal at the opening of the enclosure, welding a cathode tab extending from the cathode layer to the terminal, welding an anode tab extending from the anode layer to the enclosure, closing the enclosure to completely enclose the set of layers, and filling the enclosure with electrolyte.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Rechargeable batteries for portable electronic devices often include cells that are made of alternating layers of anode and cathode electrodes, with a separator disposed there-between. The layers may be packaged in an enclosure and may utilize an electrical feedthrough to make an electrical connection to cathode electrodes through the enclosure. The enclosure enclosing the electrodes may be filled with electrolyte thereby requiring the enclosure to be hermetically sealed to prevent unwanted leakage or failure. In addition, electrical feedthroughs must insulate the electrical connection to the cathode electrodes from the enclosure to prevent shorting of the battery cells.

Figure 1:
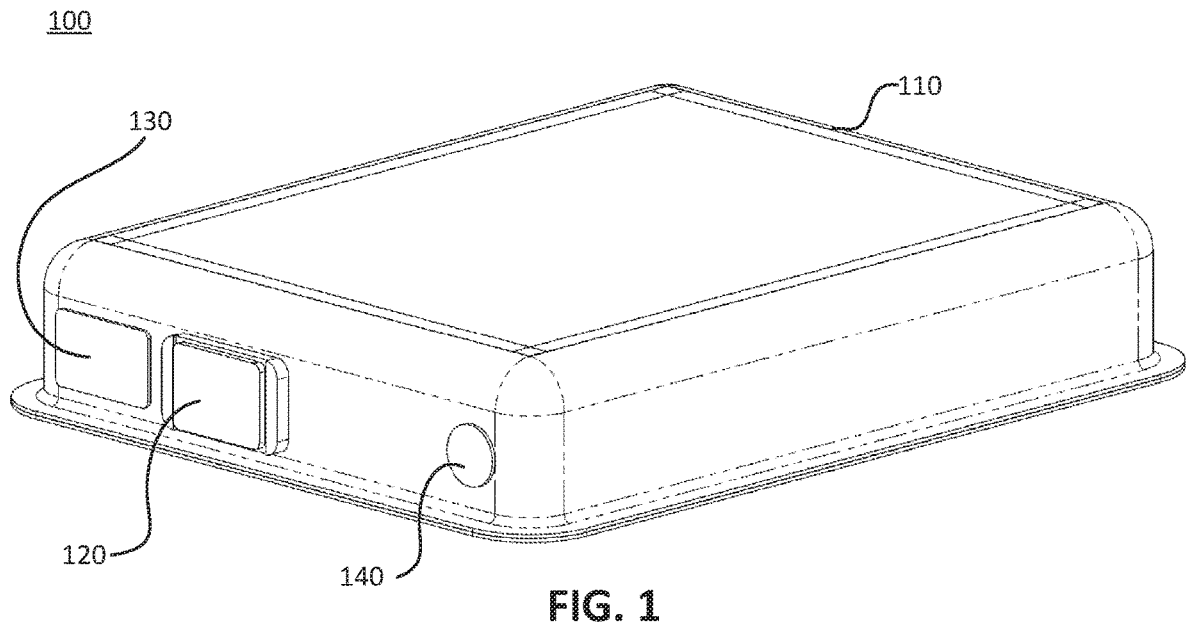
FIG. 1 illustrates a perspective view of an assembled battery, in accordance with various aspects of the subject technology.

FIG. 1 illustrates a perspective view of an assembled battery 100, in accordance with various aspects of the subject technology. The battery 100 comprises an enclosure 110, a feedthrough 120, a terminal 130 and port 140. The enclosure 110 may comprise a metal, such as aluminum or an aluminum alloy, and may have a non-corrosive coating line the interior of the enclosure 110. The enclosure 110 is configured to enclose and protect one or more cells disposed within the enclosure. In one aspect, the enclosure 110 may comprise a top portion and a bottom portion. The top portion may be configured to form a cup or open cube, cuboid, cylinder, prism, cone, pyramid or combination thereof, to receive the one or more battery cells. The bottom portion may be configured to completely enclose the one or more battery cells, and may be bonded, glued, welded, mechanically fastened or coupled, to the top portion. For example, the top portion and bottom portion of the enclosure 110 may be welded together at a periphery by welding together flanges on the top portion and the bottom portion, respectively. In another example, the top portion and bottom portion of the enclosure 110 may be welded together at a periphery by welding together a joggled overlap between the top portion and the bottom portion. In yet another example, the top portion and bottom portion of the enclosure 110 may be welded together at a periphery by welding together an overlap between the top portion and the bottom portion.

Each battery cell may comprise at least one cathode layer with an active coating, a separator, and at least one an anode layer with an active coating, as discussed with reference to FIG. 11. A tab may extend from each of the anode and cathode layers, as discussed further below. The terminal 130 may comprise a weld pad that is configured to be electrically connected or coupled to a tab extending from the anode layer. The port 140 may comprise an opening disposed within the enclosure 110 for receiving electrolyte. After the enclosure 110 is sufficiently filled with electrolyte, the port 140 may be welded or sealed shut to prevent leakage of the electrolyte, as discussed further below.

Figure 2A:
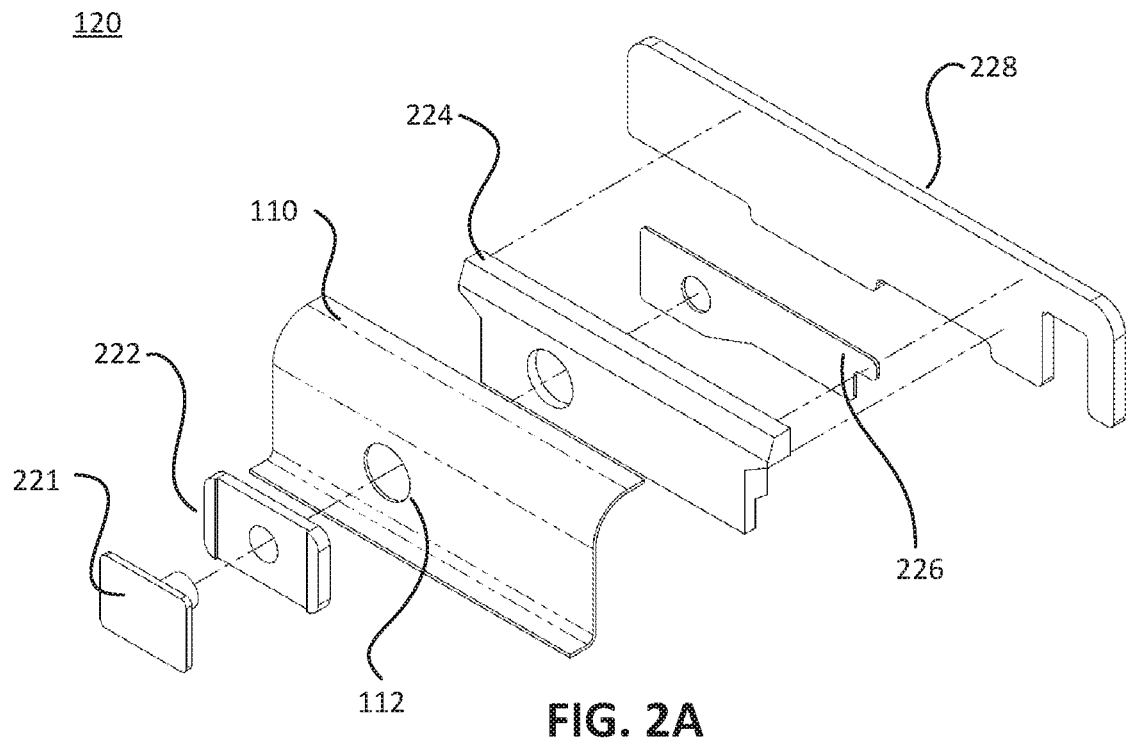
FIG. 2A illustrates an exploded view of a feedthrough, in accordance with various aspects of the subject technology.
Figure 2B:
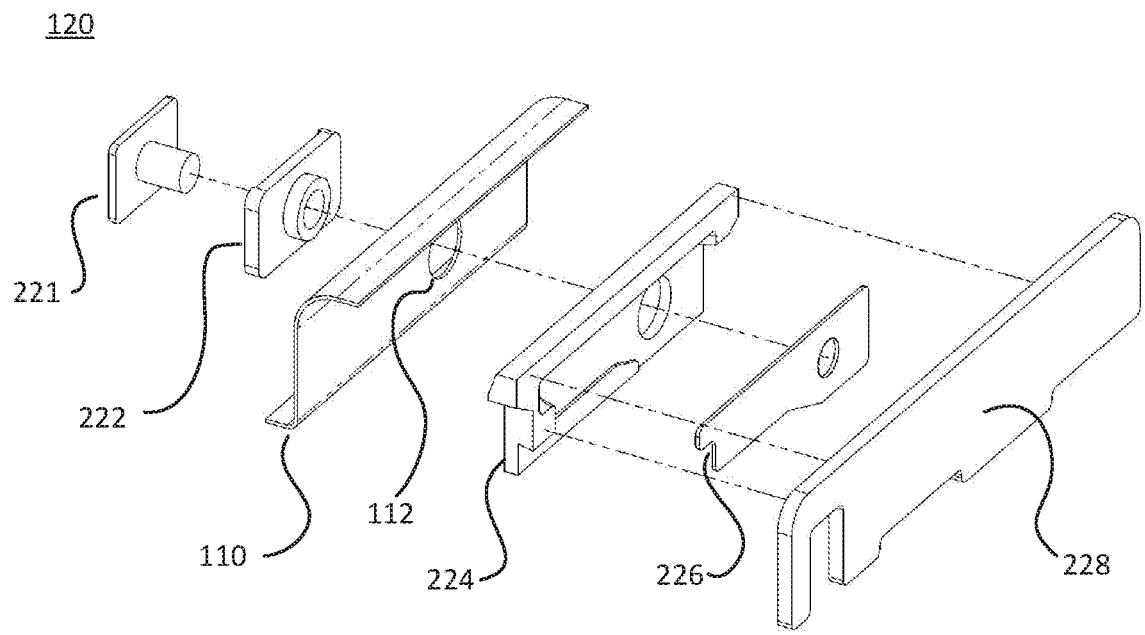
FIG. 2B illustrates an alternative exploded view of a feedthrough, in accordance with various aspects of the subject technology.

FIGS. 2A and 2B illustrate exploded views of the feedthrough 120, in accordance with various aspects of the subject technology. The feedthrough 120 may comprise a rivet 221, an outer gasket 222, an inner gasket 224, a terminal 226 and an insulator 228. The rivet 221 is configured to compress the outer gasket 222, inner gasket 224, and terminal 226 to create a seal at an opening 112 on a wall of the enclosure 110. The feedthrough 120 does not require welding to the enclosure because it utilizes a compression force generated by the rivet 221 to create a hermetic seal at the opening 112. In addition, because no welding is required, packaging efficiency for the battery 100 is improved because there is no need to accommodate a weld along a wall of the battery 100. Further, as described below, the feedthrough 120 implements a multitude of anti-rotation features to reduce and mitigate the risk that an electrical short may occur between the feedthrough 120 and the enclosure 110, as the enclosure 110 may have an anode potential and the feedthrough 120 may have a cathode potential. By mitigating or eliminating the risk of an electrical shortage, reliability of the battery 100 is greatly improved.

Figure 3:
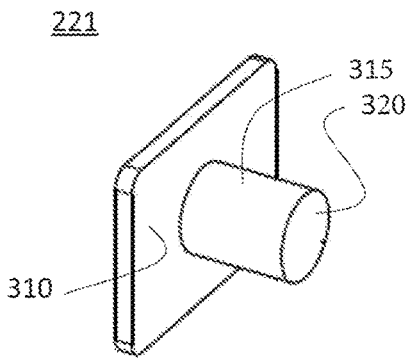
FIG. 3 illustrates a perspective view of a rivet, in accordance with various aspects of the subject technology.
Figure 8:
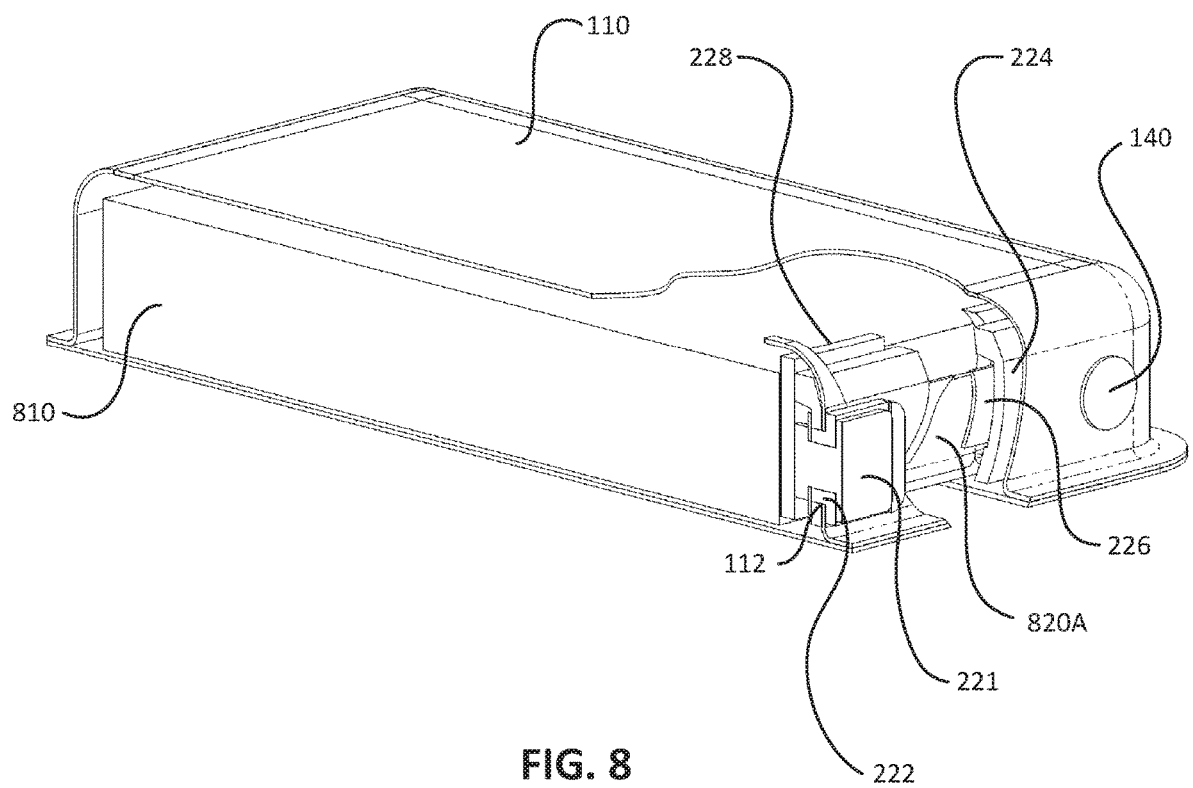
FIG. 8 illustrates a perspective partial-section view of an assembled battery, in accordance with various aspects of the subject technology.
Figure 9A:
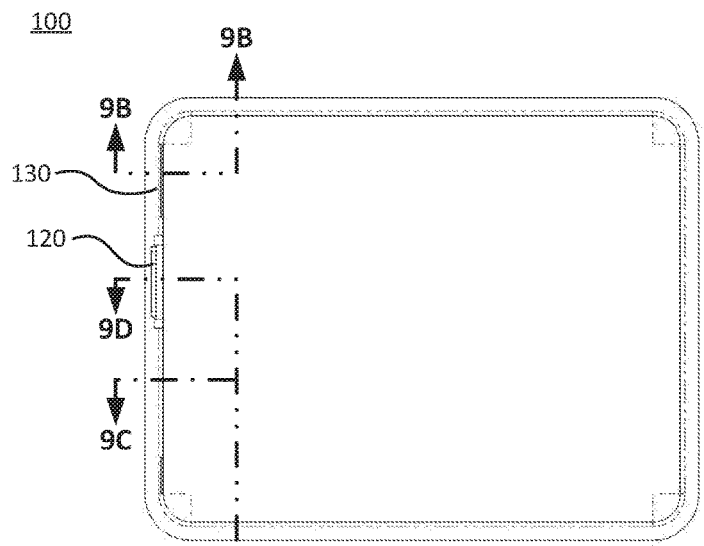
FIG. 9A illustrates a top view of an assembled battery, in accordance with various aspects of the subject technology.

FIG. 3 illustrates a perspective view of the rivet 221, in accordance with various aspects of the subject technology. The rivet 221 may comprise a planar head 310 at an end, a shank 315 extending therefrom, and a deformable tail 320 at an opposite end. Prior to installation, the deformable tail 320 may have a diameter that is substantially equal to or less than a diameter of the shank 315 extending from the planar head 310 (as shown in FIGS. 2A and 2B). The deformable tail 320 of the rivet 221 is configured to expand in diameter after the rivet 221 is installed (as shown in FIGS. 8, 9D and 10B), to thereby compress the components sandwiched between the planar head 310 and the deformable tail 320. In one aspect, the compression force generated by the rivet 221 is sufficient to create a hermetic seal at the opening 112, as well as prevent undesired rotation of the rivet 221 within the opening 112, inner gasket 224 within the enclosure 110, and/or terminal 226. The compression force generated by the rivet 221 may, for example, cause a compression stress of approximately 10-40 MPa acting on the outer gasket 222 and inner gasket 224. The rivet 221 may comprise a metal or alloy that is readily deformable, such as an aluminum alloy.

Figure 4A:
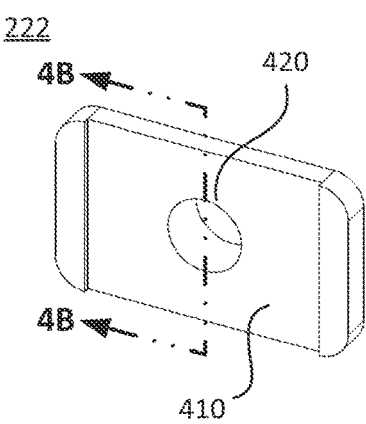
FIG. 4A illustrates a perspective view of an outer gasket, in accordance with various aspects of the subject technology.
Figure 4B:
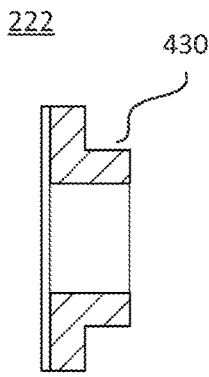
FIG. 4B illustrates a cross-section view of an outer gasket, in accordance with various aspects of the subject technology.

FIGS. 4A and 4B illustrate a perspective view and a cross-section view, respectively, of the outer gasket 222, in accordance with various aspects of the subject technology. The outer gasket 222 may be disposed adjacent to the planar head 310 of the rivet 221. The outer gasket 222 may comprise a recessed area 410 disposed at a proximal end of the outer gasket 222, an opening 420 for receiving the shank of the rivet 221, and a collar 430 disposed at a distal end of the outer gasket 222 surrounding a portion of the opening 420. The recessed area 410 may be sized to accommodate a portion of the planar head 310 of the rivet 221. The outer gasket 222 may comprise a polymer, such as perfluoroalkoxy (PFA), or other material capable of insulating electrical energy. In one aspect, the outer gasket 222 surrounds the rivet 221 to electrically insulate the rivet 221 from the enclosure 110, as shown in FIGS. 9D and 10B.

Figure 7A:
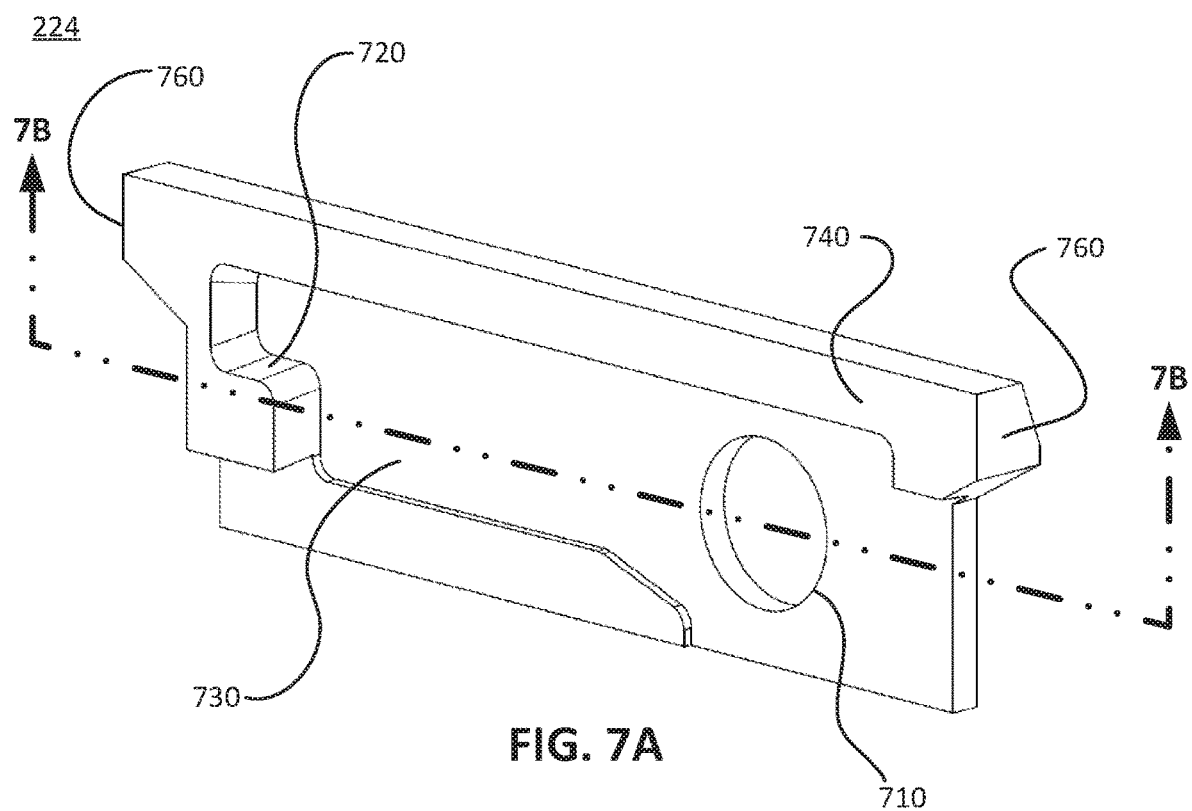
FIG. 7A illustrates a perspective view of an inner gasket, in accordance with various aspects of the subject technology.
Figure 7B:
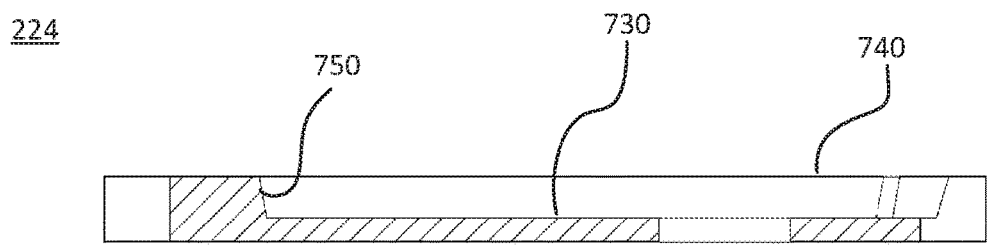
FIG. 7B illustrates a cross-section view of an inner gasket, in accordance with various aspects of the subject technology.

FIGS. 7A and 7B illustrate a perspective view and cross-section view, respectively, of the inner gasket 224, in accordance with various aspects of the subject technology. The inner gasket 224 may be disposed on the collar 430 of the outer gasket 222. The inner gasket 224 may comprise an opening 710 for receiving the collar 430 of the outer gasket 222, a protrusion 720 for engaging a corresponding notch on the terminal 226 to prevent rotation of the terminal 226 with respect to the inner gasket 224, a recessed portion 730 for seating of the terminal 226 to prevent rotation of the terminal 226 with respect to the inner gasket 224, and a mating surface 740 for attachment to the insulator 228. The inner gasket 224 may comprise a polymer, such as a pigmented polymer, and may, for example, comprise PFA, or other material capable of insulating electrical energy. In one aspect, the inner gasket 224 electrically insulates the terminal 226 from the enclosure 110, as shown in FIGS. 9D and 10B.

In one aspect, the protrusion 720 may comprise a step or ledge that is configured to engage a corresponding edge or surface of the terminal 226 to prevent rotation of the terminal 226 with respect to the inner gasket 224. For example, the step or ledge of the protrusion 720 may mechanically engage and interfere with the edge or surface of the terminal 226 to prevent inadvertently movement or rotation of the terminal 226 about a center axis of the rivet 221, thereby preventing contact or shorting with an inside surface of the enclosure 110.

In another aspect, the recessed portion 730 may completely or partially surround the terminal 226 to further prevent rotation of the terminal 226 with respect to the inner gasket 224. For example, the recessed portion 730 may comprise a recessed area surrounding by at least one side wall 750. The side wall 750 prevents one or more edges of the terminal 226 from moving or rotating independently from the inner gasket 224 because the side wall 750 surrounding the recessed area mechanically engages and prevents the terminal 226 from inadvertently moving or rotating about a center axis of the rivet 221, thereby preventing contact or shorting with an inside surface of the enclosure 110. In one aspect, the side wall 750 may have a drafted profile, as shown in FIG. 7B.

In some aspects, the inner gasket 224 may be sized to contact or to come in close proximity to one or more inside surfaces of the enclosure 110. By minimizing gaps between the inside surfaces of the enclosure 110 (top, bottom, and/or sides) and the inner gasket 224, rotation of the inner gasket 224 with respect to the enclosure 110 is also minimized, thereby improving reliability of the feedthrough 120 because unnecessary motion or rotation of the rivet 221 within the opening 112, inner gasket 224 within the enclosure 110, and/or terminal 226, may jeopardize or compromise the hermetic seal created by the compression force of the rivet 221. For example, the inner gasket 224 may have one or more protrusions 760 extending outwardly from sides of the inner gasket 224 to increase a length of the inner gasket 224 and thereby increase a contact area with the inside surface of the enclosure 110. The protrusion 760 may extend outwardly from a lateral side of the inner gasket 224 and be disposed adjacent to a corner or edge of the inner gasket 224. As shown in FIG. 7A, a first protrusion 760 may extend from a top-right corner and a separate protrusion 760 may extend from a top-left corner. In one aspect, by disposing the protrusions 760 on opposite sides and corners of the inner gasket 224, the inner gasket 224 has an increased surface area in contact with the inside surface of the enclosure 110, thereby preventing rotation of the inner gasket 224 with respect to the enclosure 110.

Figure 5:
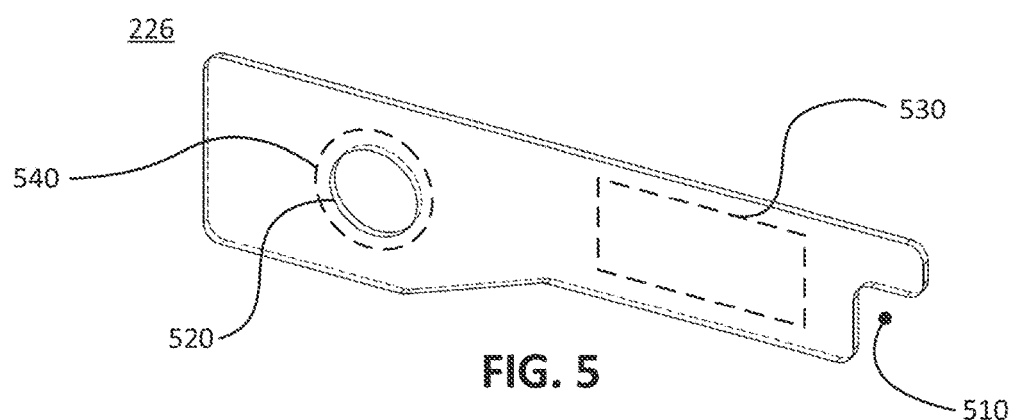
FIG. 5 illustrates a perspective view of a terminal, in accordance with various aspects of the subject technology.

Referring to FIG. 5, a perspective view of the terminal 226 is illustrated, in accordance with various aspects of the subject technology. The terminal 226 may be disposed within the recessed portion 730 of the inner gasket 224. The terminal 226 may comprise a notch 510 for engaging the protrusion 720 of the inner gasket 224, and an opening 520 for receiving the shank of the rivet 221. The terminal 226 may comprise a coupling region 530 for electrically coupling to a tab extending from the one or more battery cells enclosed within the enclosure 110, as shown in FIGS. 9C and 10B. The tab extending from the one or more battery cells may, for example, by spot welded to the coupling region 530. The terminal 226 may comprise a metal or alloy, or material that is capable of conducting electricity. When coupled to the tab extending from the one or more battery cells, electrical energy from the cathode electrodes, for example, passes through the terminal 226 to the rivet 221 to thereby provide an external terminal for the battery cell at the planar head 310 of the rivet 221.

The terminal 226 also comprises a compression region 540 for contacting the deformable tail 320 of the rivet 221 when the deformable tail 320 of the rivet 221 is expanded and the rivet 221 is in an installed or deployed configuration. In one aspect, the compression region 540 is adequately sized to handle the compression force generated by the rivet 221. The compression region 540 may, for example, have a minimum area of about 0.44 mm, sufficient to support a rivet head having a diameter of about 1.15 mm.

Figure 6:
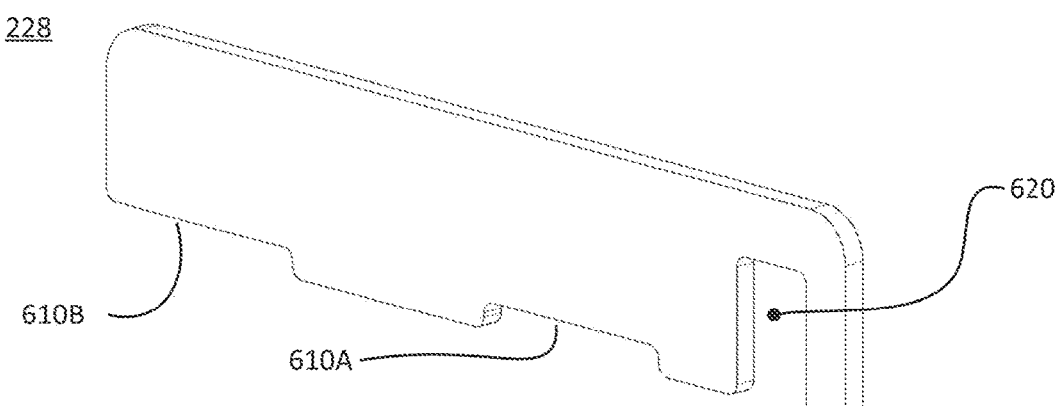
FIG. 6 illustrates a perspective view of an insulator, in accordance with various aspects of the subject technology.

FIG. 6 illustrates a perspective view of the insulator 228, in accordance with various aspects of the subject technology. The insulator 228 may be disposed directly on the mating surface 740 of the inner gasket 224 and between the one or more battery cells 810 and the inner gasket 224, to prevent physical contact between the one or more battery cells 810 and the terminal 226 or rivet 221 of the feedthrough 120, as shown in FIGS. 9D and 10B. A material of the insulator 228 may comprise a polypropylene, PFA, Polyimide, polyethylene terephthalate, or other material that may be used to insulate electrical energy.

Figure 9B:
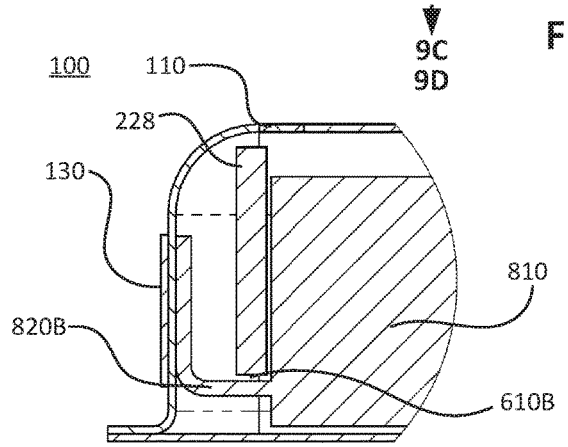
FIG. 9B illustrates a partial-section view of an anode terminal, in accordance with various aspects of the subject technology.
Figure 9C:
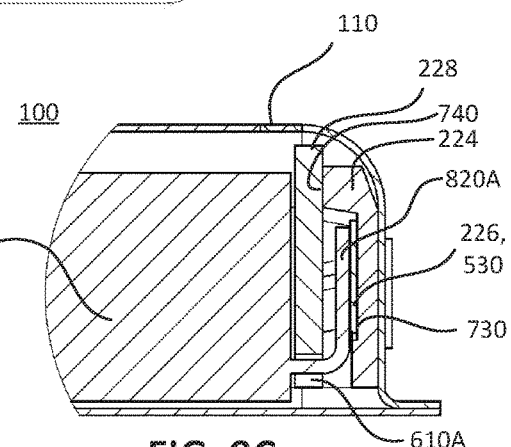
FIG. 9C illustrates a partial-section view of a cathode tab welded to a terminal, in accordance with various aspects of the subject technology.
Figure 9D:
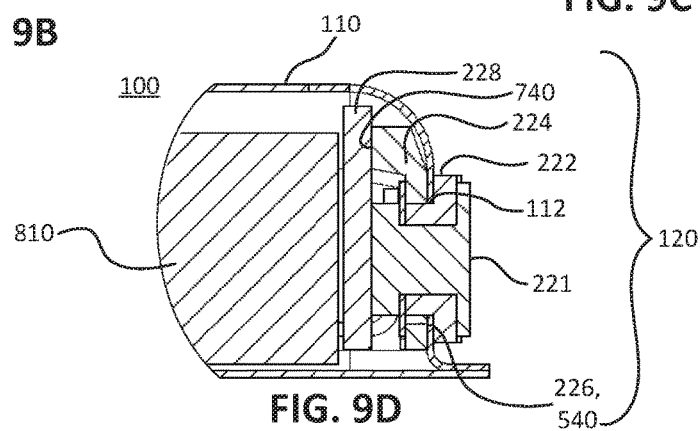
FIG. 9D illustrates a partial-section view of a cathode feedthrough, in accordance with various aspects of the subject technology.

The insulator 228 may comprise a first notch 610A to accommodate pass-through of a first tab 820A extending from the one or more battery cells 810 (as shown in FIG. 9C), and a second notch 610B to accommodate pass-through of a second tab 820B extending from the one or more battery cells 810 (as shown in FIG. 9B). The insulator 228 may also comprise a filling notch 620 to allow electrolyte to flow through the port 140 and into the enclosure 110.

In one aspect the insulator 228 is bonded to the mating surface 740 of the inner gasket 224 to maintain a relationship between the insulator 228 and the inner gasket 224. In one example, a layer of adhesive may be disposed between the mating surface 740 of the inner gasket 224 and the insulator 228 to glue the insulator 228 into position between the one or more battery cells and the feedthrough 120. In another example, the insulator 228 may be welded to the mating surface 740 of the inner gasket 224 through a laser transmission welding operation. In this example, the insulator 228 may comprise a transparent polymer and the inner gasket 224 may comprise a pigmented polymer. A laser having a wavelength in a range of about 800 nm to about 2000 nm may be used to bond or weld the inner gasket 224 and the insulator 228 together.

Referring to FIG. 8, a perspective partial-section view of the assembled battery 100 is provided, in accordance with various aspects of the subject technology. The battery 100 comprises a battery cell 810 enclosed in the enclosure 110. A first tab 820A extending from a cathode electrode of the battery cell 810 passes through the first notch (not shown) of the insulator 228 and is welded to the terminal 226. The terminal 226 is seated within the recess portion of the inner gasket 224. The inner gasket 224 is disposed within the enclosure 110 and surrounds the collar of the outer gasket 222. The rivet 221 is shown in a deployed configuration with the deformable tail expanded, thereby compressing the terminal 226, inner gasket 224, outer gasket 222, and side wall of the enclosure 110 to create a hermetic seal at the opening 112.

FIG. 9A illustrates a top view of the assembled battery 100, in accordance with various aspects of the subject technology. The battery 100 includes a terminal 130, which may, for example, comprise an anode terminal; and a feedthrough 120, which may, for example, comprise a cathode feedthrough.

FIG. 9B illustrates a partial-section view of the anode terminal 130, in accordance with various aspects of the subject technology. The battery cell 810 is enclosed within the enclosure 110. The second tab 820B extends from the battery cell 810 and may, for example, comprise an anode tab. The anode tab 820B may extend through the second notch 610B of the insulator 228. The insulator 228 may be configured to prevent inadvertent contact, physical and/or electrical, between the battery cell 810 and the inside surface of the enclosure 110 and/or the anode tab 820B. The anode tab 820B may be welded by, for example, a spot-welding operation, to the inside surface of the enclosure 110. Disposed on an outside surface of the enclosure 110 and directly opposite of the anode tab 820B, may be the weld pad.

FIG. 9C illustrates a partial-section view of a cathode tab welded to the terminal 226, in accordance with various aspects of the subject technology. As shown, the battery cell 810 is enclosed within the enclosure 110. The first tab 820A extends from the battery cell 810 and may, for example, comprise a cathode tab. The cathode tab 820A may extend through the first notch 610A of the insulator 228. The insulator 228 may be configured to prevent inadvertent contact, physical and/or electrical, between the battery cell 810 and the inside surface of the enclosure 110 and/or the cathode tab 820A. The cathode tab 820A may be welded by, for example, a spot-welding operation, to the coupling region 530 of the terminal 226. As also shown in FIG. 9C, the insulator 228 is mounted to or otherwise attached, welded, or bonded to the mating surface 740 of the inner gasket 224 to keep the insulator 228 in place. As also shown, the terminal 226 is disposed within the recessed portion 730 of the inner gasket 224.

FIG. 9D illustrates a partial-section view of the cathode feedthrough 120, in accordance with various aspects of the subject technology. As shown, the battery cell 810 is enclosed within the enclosure 110. The rivet 221 compresses the outer gasket 222, inner gasket 224, terminal 226, and side wall of the enclosure 110 to create a hermetic seal at the opening 112. The deformable tail 320 of the rivet 221 is shown in an expanded or deployed state and engages the compression region 540 of the terminal 226 at one end, while the planar head 310 of the rivet 221 acts upon the recessed area 410 of the outer gasket 222 at an opposite end. The insulator 228 prevents inadvertent physical or electrical contact between the battery cell 810 and the feedthrough 120, and more specifically, prevents contact between the battery cell 810 and the rivet 221 or the terminal 226. As also shown in FIG. 9D, the insulator 228 is mounted to or otherwise attached, welded, or bonded to the mating surface 740 of the inner gasket 224 to keep the insulator 228 in place.

Figure 10A:
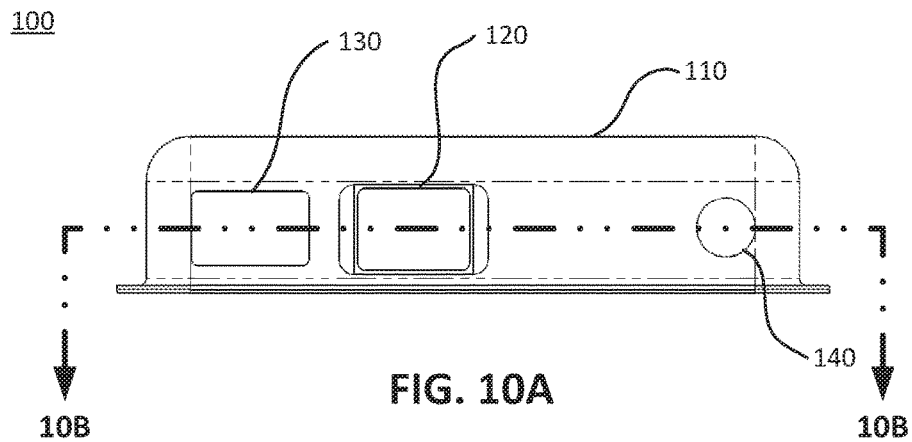
FIG. 10A illustrates a front view of an assembled battery, in accordance with various aspects of the subject technology.
Figure 10B:
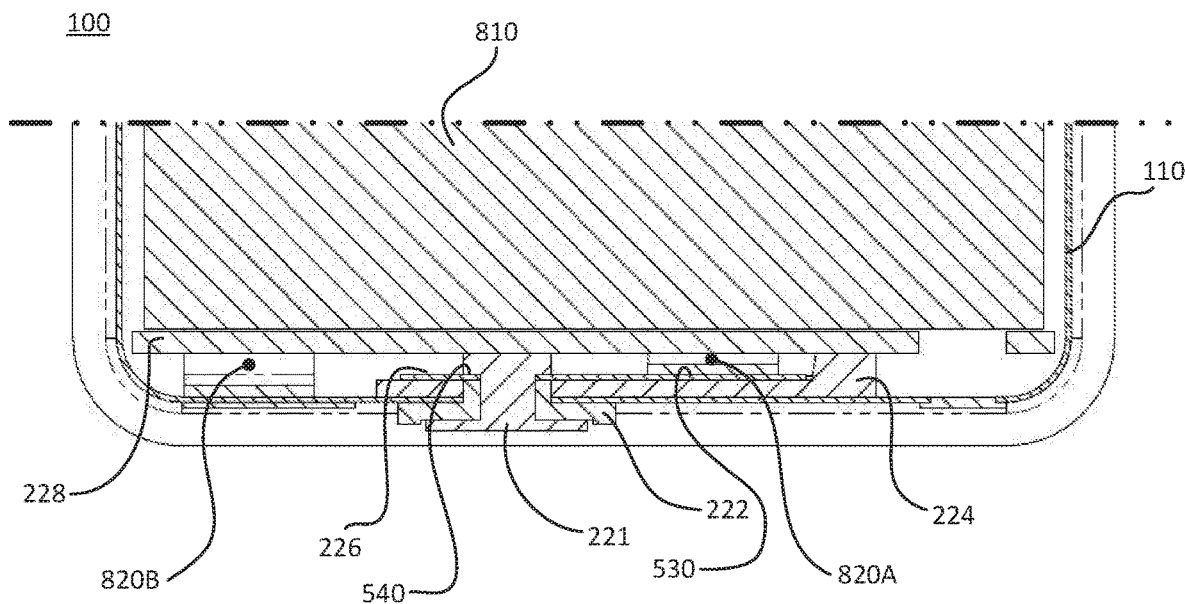
FIG. 10B illustrates a partial-section view of an assembled battery, in accordance with various aspects of the subject technology.

FIG. 10A illustrates a front view of the assembled battery 100, in accordance with various aspects of the subject technology. The battery 100 comprises the enclosure 110, feedthrough 120, terminal 130, and port 140. FIG. 10B illustrates a partial-section view of the assembled battery 100, in accordance with various aspects of the subject technology. The battery cell 810 is enclosed within the enclosure 110. The first tab 820A is coupled to the terminal 226 and the second tab 820B is coupled to the enclosure 110 at the terminal 130. The insulator 228 prevents contact and provides electrical insulation between the battery cell 810 and the rivet 221, terminal 226, first tab 820A and the second tab 820B. The outer gasket 222 surrounds and insulates the rivet 221 as the rivet 221 passes through the enclosure 110. The insulator 228 is mounted, bonded, welded, or otherwise affixed to the inner gasket 224 to maintain the position of the insulator 228 within the enclosure 110.

Figure 11:
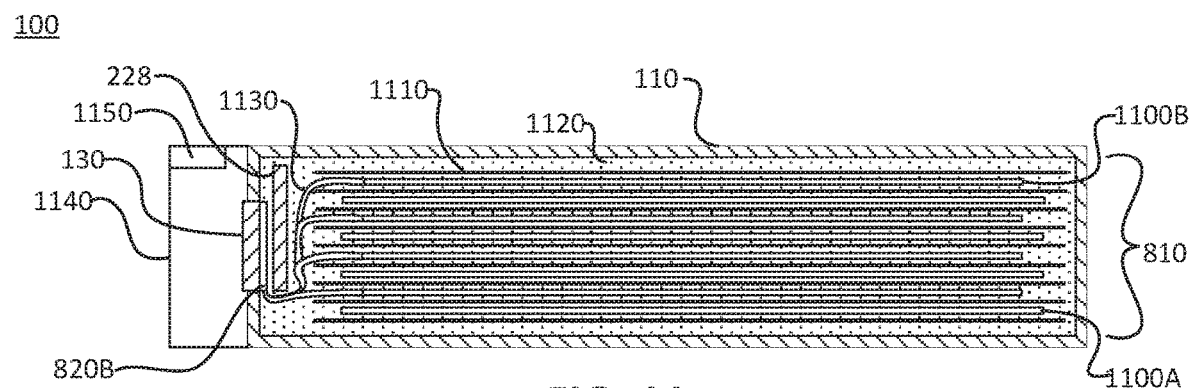
FIG. 11 illustrates a cross-section view of an assembled battery, in accordance with various aspects of the subject technology.

FIG. 11 illustrates a cross-section view of the assembled battery 100, in accordance with various aspects of the subject technology. The assembled battery 100 includes the battery cell 810 enclosure 110, a battery management unit 1140, and battery terminals 1150. The battery management unit 1140 is configured to manage recharging of the battery cell 810. The terminals 1150 are configured to engage with corresponding connectors on a portable electronic device to provide power to components of the portable electronic device.

The battery cell 810 includes a plurality of layers comprising a cathode with an active coating 1100A, a separator 1110, and an anode with an active coating 1100B. For example, the cathode 1100A may be an aluminum foil coated with a lithium compound (e.g., $LiCoO_2$, LiNCoMn, LiCoAl or $LiMn_2O_4$) and the anode 1100B may be a copper foil coated with carbon or graphite. The separator 1110 may include polyethylene (PE), polypropylene (PP), and/or a combination of PE and PP, such as PE/PP or PP/PE/PP. The separator 1110 comprises a micro-porous membrane that also provides a "thermal shut down" mechanism. If the battery cell reaches the melting point of these materials, the pores shut down which prevents ion flow through the membrane.

The plurality of layers may be wound to form a jelly roll structure or can be stacked to form a stacked-cell structure. The plurality of layers are enclosed within enclosure 110 and immersed in an electrolyte 1120, which for example, can be a LiPF6-based electrolyte that can include Ethylene Carbonate (EC), Polypropylene Carbonate (PC), Ethyl Methyl Carbonate (EMC) or DiMethyl Carbonate (DMC). The electrolyte can also include additives such as Vinyl carbonate (VC) or Polyethylene Soltone (PS). The electrolyte can additionally be in the form of a solution or a gel.

The cathode layers 1100A of the plurality of layers are coupled to the first tab 820A (not shown) through intermediate tabs (not shown) extending from each cathode layer 1100A. The anode layers 1100B of the plurality of layers are coupled to the second tab 820B through intermediate tabs 1130 extending from each anode layer 1100B. The first tab 820A and the second tab 820B extend from the battery cell 810 for electrical connection to other battery cells, the battery management unit 1140, or other components as desired. As discussed above, the second tab 820B may be electrically coupled to the enclosure at the terminal 130. As also discussed above, the first tab 820A may be electrically coupled to the feedthrough 120 (not shown). As further discussed above, the insulator 228 may be disposed between the battery cell 810 and the inside surface of the enclosure 110.

Figure 12:
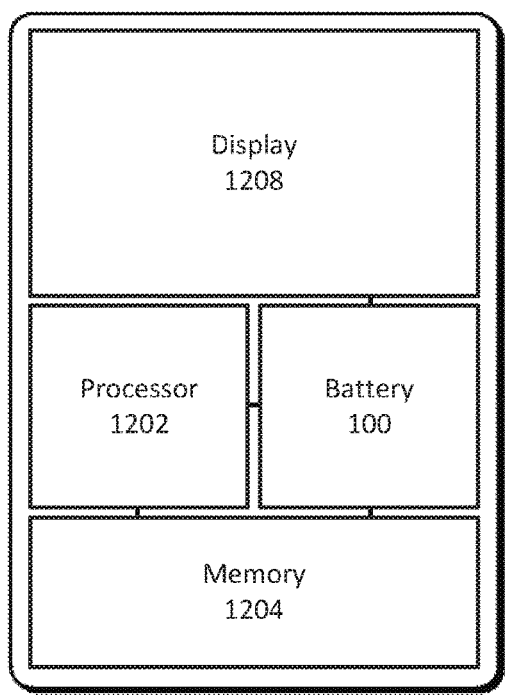
FIG. 12 illustrates a portable electronic device, in accordance with various aspects of the subject technology.

FIG. 12 illustrates a portable electronic device 1200, in accordance with various aspects of the subject technology. The above-described rechargeable battery 100 can generally be used in any type of electronic device. For example, FIG. 12 illustrates a portable electronic device 1200 which includes a processor 1202, a memory 1204 and a display 1208, which are all powered by the battery 100. Portable electronic device 1200 may correspond to a laptop computer, tablet computer, mobile phone, personal digital assistant (PDA), digital music player, watch, and wearable device, and/or other type of battery-powered electronic device. Battery 100 may correspond to a battery pack that includes one or more battery cells. Each battery cell may include a set of layers sealed in an enclosure, including a cathode with an active coating, a separator, an anode with an active coating, and utilize an electrical feedthrough that maximizes packaging efficiency and increases reliability by preventing accidental or inadvertent electrical shortage through implementation of anti-rotation features and an insulator, as described above.

Figure 13:
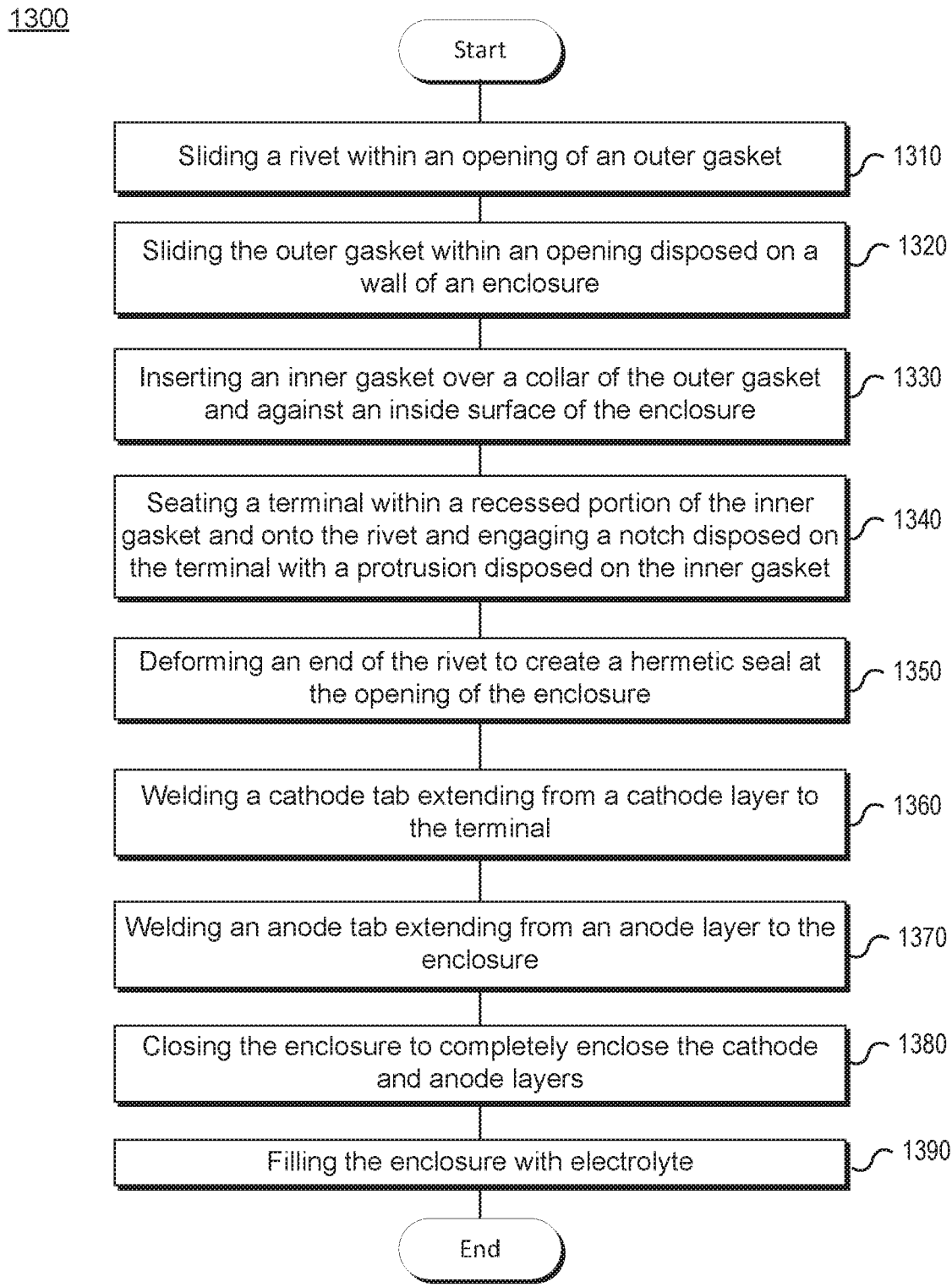
FIG. 13 illustrates an example method for manufacturing a battery cell, in accordance with various aspects of the subject technology.

FIG. 13 illustrates an example method 1300 for manufacturing a battery cell, in accordance with various aspects of the subject technology. It should be understood that, for any process discussed herein, there can be additional, fewer, or alternative steps performed in similar or alternative orders, or in parallel, within the scope of the various embodiments unless otherwise stated.

At operation 1310, a rivet is slid within an opening of an outer gasket. At operation 1320, the outer gasket is slid within an opening disposed on a wall of an enclosure. As described above, the enclosure configured to protect a set of layers that comprise a battery cell. The set of layers includes a cathode layer, an anode layer, and a separator layer disposed between the cathode layer and the anode layer. At operation 1330, an inner gasket is inserted over a collar of the outer gasket and against an inside surface of the enclosure. As described above, the inner gasket includes a recessed portion, a mating surface, and an anti-rotation protrusion.

At operation 1340, a terminal is seated within the recessed portion of the inner gasket and onto the rivet. The terminal comprises a notch for engaging the anti-rotation protrusion of the inner gasket to prevent rotation of the terminal with respect to the inner gasket. At operation 1350, an end of the rivet is deformed to create a hermetic seal at the opening of the enclosure. In one aspect, to create a hermetic seal at the opening, a compressive force between a head of the rivet and the deformed end of the rivet is generated against the outer gasket, the wall of the enclosure, the inner gasket, and the terminal.

At operation 1360, a cathode tab extending from the cathode layer is welded to the terminal. At operation 1370 an anode tab extending from the anode layer is welded to the enclosure. At operation 1380, the enclosure is closed to completely enclose the set of layers. At operation 1390, the enclosure is filled with electrolyte.

The method 1300 may further include bonding an insulator to the mating surface of the inner gasket so that the insulator is disposed between the set of layers of the battery cell and the inner gasket to prevent physical and/or electrical contact between the set of layers and the terminal or rivet. In one example, the insulator may be bonded to the mating surface of the inner gasket using an adhesive layer. In another example, the insulator may be welded to the mating surface of the inner gasket. In this example, the inner gasket may be composed of a pigmented polymer and the insulator may be composed of a transparent polymer. Welding of the insulator to the mating surface of the inner gasket may be accomplished using a laser transmission welding process to weld the insulator to the mating surface of the inner gasket. A wavelength that may be used for laser transmission welding may have a range of about 800 nm to about 2000 nm.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A battery cell, comprising:
   a set of layers comprising a cathode layer, an anode layer, and a separator layer disposed between the cathode layer and the anode layer;
   an enclosure enclosing the set of layers, the enclosure comprising an opening for receiving a feedthrough, the feedthrough comprising:
   a rivet comprising a planar head at an end, a shank extending therefrom, and a deformable tail at an opposite end, the rivet formed of a conductive material;

an outer gasket disposed adjacent to the planar head of the rivet, the outer gasket formed of an insulating material and comprising an opening for receiving the shank of the rivet, and a collar;

an inner gasket disposed on the collar of the outer gasket, the inner gasket formed of an insulating material and comprising an opening for receiving the collar of the outer gasket, a recessed area, an insulator mating surface, and an anti-rotation protrusion;

a terminal disposed within the recessed area of the inner gasket, the terminal formed of a conductive material and comprising an opening for receiving the shank of the rivet and a notch for engaging the anti-rotation protrusion of the inner gasket;

an insulator supported by the insulator mating surface of the inner gasket, the insulator formed of an insulating material; and an adhesive layer, the adhesive layer disposed between the insulator and the insulator mating surface of the inner gasket, wherein the insulator is bonded to the insulator mating surface of the inner gasket by the adhesive layer.

2. The battery cell of claim 1, wherein the insulator further comprises a first notch for the tab to extend therethrough, and a second notch for a second tab to extend therethrough, the second tab extending from the set of layers.

3. The battery cell of claim 1,
wherein the inner gasket is composed of a pigmented polymer;
wherein the insulator is composed of a transparent polymer; and
wherein the insulator is welded to the mating surface of the inner gasket through a laser transmission welding operation.

4. The battery cell of claim 3, wherein a wavelength of the laser is in a range of about 800 nm to about 2000 nm.

5. The battery cell of claim 1, wherein the mner gasket comprises a perfluoroalkoxy (PF A) material.

6. The battery cell of claim 1, wherein the insulator comprises at least one of a polypropylene, PF A, Polyimide and polyethylene terephthalate material.

7. The battery cell of claim 1, further comprising a tab that extends from the set of layers, wherein the tab is electrically coupled to the terminal and the rivet to form an external battery terminal at the rivet.

8. The battery cell of claim 1, wherein the insulator is disposed between the set of layers and the inner gasket to prevent physical contact between the set of layers and the feed through.

9. A battery feedthrough, comprising:
a rivet comprising a planar head at an end, a shank extending therefrom, and a deformable tail at an opposite end, the rivet formed of a conductive material;

an outer gasket disposed adjacent to the planar head of the rivet, the outer gasket formed of an insulating material and comprising an opening for receiving the shank of the rivet, and a collar;

an inner gasket disposed on the collar of the outer gasket, the inner gasket formed of an insulating material and comprising an opening for receiving the collar of the outer gasket, a recessed area, an insulator mating surface, and an anti-rotation protrusion;

a terminal disposed within the recessed area of the inner gasket, the terminal formed of a conductive material and comprising an opening for receiving the shank of the rivet and a notch for engaging the anti-rotation protrusion of the inner gasket;

an insulator supported by the insulator mating surface of the inner gasket, the insulator formed of an insulating material; and an adhesive layer, the adhesive layer disposed between the insulator and the insulator mating surface of the inner gasket, wherein the insulator is bonded to the insulator mating surface of the inner gasket by the adhesive layer.

10. The battery feedthrough of claim 9,
wherein the inner gasket is composed of a pigmented polymer;
wherein the insulator is composed of a transparent polymer; and
wherein the insulator is welded to the insulator mating surface of the inner gasket through a laser transmission welding operation.

11. The battery feedthrough of claim 10, wherein a wavelength of the laser transmission is in a range of about 800 nm to about 2000 nm.

12. The battery feedthrough of claim 9, wherein the inner gasket comprises a perfluoroalkoxy (PFA) material.

13. The battery feedthrough of claim 9, wherein the insulator comprises at least one of a polypropylene, PF A, Polyimide and polyethylene terephthalate material.

14. The battery feedthrough of claim 9, wherein the planar head of the rivet is configured to form an external terminal of a battery.

15. The battery feedthrough of claim 9, wherein the insulator is configured to prevent physical contact between one or more cells of a battery and one or more of the terminal and the rivet of the battery feedthrough.

* * * * *

UNITED STATES PATENT AND TRADEMARK OFFICE
CERTIFICATE OF CORRECTION

PATENT NO. : 11,431,047 B2
APPLICATION NO. : 16/040719
DATED : August 30, 2022
INVENTOR(S) : Christopher R. Pasma and Brian K. Shiu It is certified that error appears in the above-identified patent and that said Letters Patent is hereby corrected as shown below:

In the Claims

Claim 5, beginning at Column 11, Line 38:
"mner" should be --inner-- and

Claim 5, beginning at Column 11, Line 39:
"(PF A)" should be --(PFA)--

Claim 6, beginning at Column 11, Line 41:
"(PF A)" should be --(PFA)--

Claim 13, beginning at Column 12, Line 41:
"(PF A)" should be --(PFA)--

Signed and Sealed this
Twenty-fifth Day of October, 2022

Katherine Kelly Vidal
*Director of the United States Patent and Trademark Office*